United States Patent
Knauff et al.

(10) Patent No.: US 6,835,057 B2
(45) Date of Patent: Dec. 28, 2004

(54) INJECTION UNIT FOR AN INJECTION-MOLDING MACHINE

(75) Inventors: Axel Knauff, Munnerstadt (DE); Wolfgang Lienke, Obermichelbach (DE); Klaus Oberndorfer, Erlangen (DE); Klaus Recker, Neumarkt (DE); Elmar Schaeffers, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/938,759

(22) Filed: Aug. 24, 2001

(65) Prior Publication Data

US 2002/0076465 A1 Jun. 20, 2002

(30) Foreign Application Priority Data

Nov. 27, 2000 (DE) .......................................... 100 58 866

(51) Int. Cl.[7] .............................................. B29C 45/77
(52) U.S. Cl. ........................ 425/145; 425/150; 425/574
(58) Field of Search .................................. 425/145, 150, 425/574

(56) References Cited

U.S. PATENT DOCUMENTS 5,804,224 A * 9/1998 Inaba et al. .................. 425/150
6,340,439 B1 * 1/2002 Hiraoka ...................... 425/145

FOREIGN PATENT DOCUMENTS

DE          4344335 A1     6/1995

* cited by examiner

Primary Examiner—Tim Heitbrink
(74) Attorney, Agent, or Firm—Baker Botts L.L.P.

(57) ABSTRACT

An injection unit for an injection-molding machine for processing thermoplastic material is designed in such a way that a direct drive (EM) which meets high dynamic requirements is used for the injection operation and that a standard motor (DM), the rotational speed of which is optimized to the material preparation process by a gear mechanism (R, RS1, RS2), is used for the material preparation, in which such dynamic requirements do not exist.

6 Claims, 1 Drawing Sheet

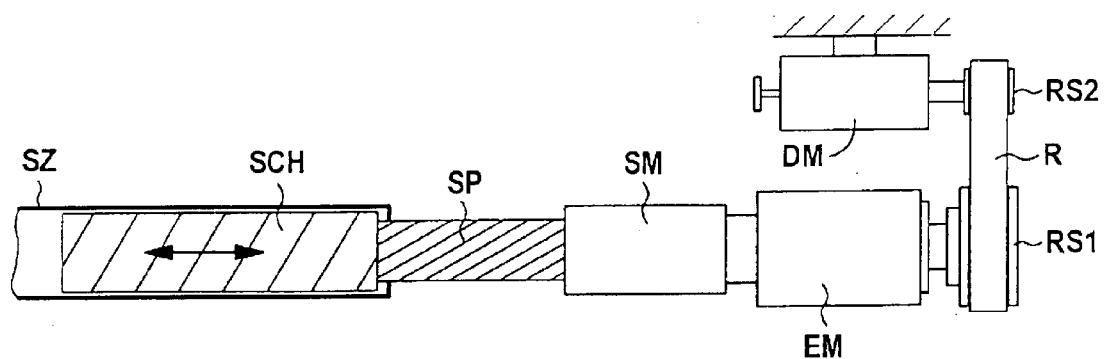

INJECTION UNIT FOR AN INJECTION-MOLDING MACHINE

FIELD OF THE INVENTION

The present invention relates to an injection unit for an injection-molding machine for processing thermoplastic material, the injection-molding machine having a screw which is guided in a cylinder and the axial movement of which can be initiated by a first motor and the rotary movement of which can be initiated by a second motor, an electrical direct drive being provided as the first motor.

BACKGROUND OF THE INVENTION

An injection unit of this type is known from DE 43 44 335 A1. In this unit, polymer is forced out into a mold by a linear movement of a stationary screw. This operation takes place with a first direct drive. However, material preparation of the polymer has been initiated in each case beforehand by turning of the screw in an assigned cylinder with the aid of a second direct drive.

Direct drives have the advantage of having very good dynamics, one of the ways in which this is manifested being a very short time span to reach the injection speed. However, direct drives entail relatively high costs. This is because it is not only necessary for the motor to be adapted to the geometry of the machine but also to produce a very high torque at relatively low rotational speeds to provide the required injection speed with the desired injection pressure.

In the case of direct drives, both the injection motor and the metering motor have to supply a relatively great torque, which is derived, inter alia, from the injection pressure. The second motor, i.e. the metering motor, only moves, however, at rotational speeds which are significantly below the operationally required rotational speed of the injection motor. For example, one possible configuration is designed in such a way that the injection motor has to produce a torque of 1000 Nm at a maximum rotational speed of 1000 rpm, whereas the metering motor has to provide a torque of 1000 Nm for a rotational speed of below 300 rpm.

In commercially available machines, the two movements are transmitted by indirect drives, using belts or gear mechanisms. The adaptation of the motor torque and motor speed to the requirements of the injection unit then takes place by the respective transmission ratio. In this case, the dynamics for automatic controlling operations are less, however, than in the case of direct drives, but use of standard drives can be made possible by the design of the gear mechanisms.

SUMMARY OF THE INVENTION

The object of the invention is to provide an injection unit of the type described above in which optimum conditions with respect to performance and cost-effectiveness are achieved for the overall arrangement.

The inventors have found that the dynamic requirements in the case of injection units of the type described above are indeed very high for the actual injection operation but not so high for the metering operation, the stated object can be achieved by only the second motor being connected to the screw via a gear mechanism, in such a way that the rotational speed of the second motor can be reduced to a lower speed of the screw, adapted to the material-preparing process.

A first advantageous design of the invention is characterized in that the gear mechanism can be blocked during the operation of injecting the thermoplastic material. This prevents the metering motor from having to supply a torque during injection.

In a technically extremely simple form, this block may be provided as a back stop, as shown in the figure described below.

An extremely low-cost configuration is obtained by the fact that a belt-pulley gear is provided as the gear mechanism.

The fact that the first motor rotatably moves a spindle, which is connected to a screw, via a displaceably secured spindle nut allows a rotating motor to be used as a drive for producing the axial movement in this respect. Consequently, unlike in the case of using purely linear drives, it is possible to fall back on standard components.

BRIEF DESCRIPTION OF THE DRAWING

An exemplary embodiment of the invention is explained in more detail below in conjunction with the appended drawing. The single FIGURE of which illustrates the arrangement of the invention in simplified form.

DESCRIPTION OF THE INVENTION

The arrangement of the invention, as shown in the drawing, includes a screw SCH, which is mounted to be axially and rotationally movable in a screw cylinder SZ. The free end of the screw cylinder SZ, facing the actual mold parts of the injection-molding machine, is shown in cutaway section. Similarly, feeding elements for pelletized polymer material, for example, into the interior of the screw cylinder SZ are likewise not shown for the sake of overall clarity. The screw SCH is firmly connected to a spindle SP, on which there is mounted a spindle nut SM. The spindle nut is set in to rotation by a first motor, i.e. an injection motor EM, and secured against axial displacement to the motor. In such rotation, with the spindle secured against displacement, axial movement of the screw indicated by a double-headed arrow is initiated, as required for forcing prepared thermoplastic material out of the screw cylinder SZ into the mold, i.e. for the injection operation.

The spindle SP has, furthermore, on its free end a belt pulley RS1, which is connected via a belt R to a second motor, metering motor DM. When metering motor DM is set in rotation, reduced-speed rotation of the spindle SP and consequently of the screw SCH occurs. This brings about a thorough mixing of the polymer pellets and, at the assumed ambient temperatures, the thermoplastic material is prepared for injection, i.e. metered. Since rotation of the spindle SP with the spindle nut SM unmoved would cause axial movement of the screw SCH and of the spindle SP, this movement countered by an offsetting rotational movement of the injection motor EM. This action ultimately ensures that the prepared thermoplastic material is made available for injection, ready for the production process, only at a desired system pressure in the screw cylinder SZ.

The metering motor DM can be effectively disconnected from spindle SP during the injection operation, during which only the injection motor EM is active, by blocking the gear mechanism comprising the belt R and belt pulleys RS1 and RS2. Moreover, as contrasted with the prior art discussed above, the metering motor DM is also completely protected by the belt gear mechanism from axial forces, which would otherwise require expensive axial bearings for absorbing the forces. The metering motor DM may be designed as a built-on motor and run with a high rotational speed and a correspondingly great transmission ratio. If, as in the example discussed above, a torque of 1000 Nm is to be produced at a rotational speed of 300 rpm, a motor with a torque of 100 Nm and a rotational speed of 3000 rpm can be used if there is a transmission ratio of 10:1.

Consequently, according to the invention, an expensive direct drive is used only where the high dynamics which can be achieved with it are actually required. This leads to a decisive cost advantage over the prior art. If an asynchronous motor is used as the metering motor DM, the costs can be further reduced considerably.

A further important aspect of injection-molding machines is the overall length of the installation. The direct drives according to the prior art are arranged one behind the other and therefore contribute to the total length. In the case of the present invention, in which the second motor, i.e. the metering motor DM, is realized by an indirect drive, it can be mounted, for example, underneath the unit, thereby reducing the total overall length significantly.

We claim:

1. An injection unit for an injection molding machine for processing thermoplastic material, said molding machine having a screw guided in a cylinder, comprising
   a first motor coupled to said screw for axially moving said screw in said cylinder for injecting said thermoplastic material, wherein its axial motion is driven by a spindle coupled with a spindle nut, said spindle nut being directly driven by said first motor, and
   a second motor coupled to said screw by a gear mechanism for rotating said screw for preparing said thermoplastic material for injection, said gear mechanism reducing the rotational speed of said screw relative to said second motor to a speed appropriate for the preparation of said material for injection, wherein the two motors, gear mechanism and spindle nut, apart from rotatary motion, are stationary, and the spindle is rotatably and displaceably arranged between the spindle nut and the screw.

2. The injection unit according to claim 1, wherein the gear mechanism is blocked during the operation of injecting the thermoplastic material.

3. The injection unit according to claim 2, wherein a belt-pulley gear is provided as the gear mechanism.

4. An injection unit for an injection molding machine for processing thermoplastic material, comprising:
   a screw guided in a cylinder,
   a spindle having a first end axially attached to said screw and a second end,
   a first motor directly driving a spindle nut which is engaged with said spindle to create an axial motion of said screw in said cylinder for injecting said thermoplastic material,
   a second motor coupled to said second end of said spindle by a gear mechanism for rotating said screw for preparing said thermoplastic material for injection, said gear mechanism reducing the rotational speed of said screw relative to said second motor to a speed appropriate for the preparation of said material for injection, wherein the two motors, gear mechanism and spindle nut, apart from rotatary motion, are stationary, and the spindle and screw are rotatably and displaceably arranged.

5. The injection unit according to claim 4, wherein the gear mechanism is blocked during the operation of injecting the thermoplastic material.

6. The injection unit according to claim 2, wherein a belt-pulley gear is provided as the gear mechanism.

* * * * *